United States Patent Office 3,309,387
Patented Mar. 14, 1967

3,309,387
19-LOWER ALKYL ANDROSTANES AND PREGNANES
Andor Fürst and Ernest Gerhard Herzog, Basel, Switzerland, assignors to Hoffmann-La Roche Inc., Nutley, N.J., a corporation of New Jersey
No Drawing. Filed July 1, 1964, Ser. No. 379,709
Claims priority, application Switzerland, July 19, 1963, 8,513/63
4 Claims. (Cl. 260—397.5)

The present invention relates to processes and intermediates for the preparation of 19-alkylsteroids, and more particularly, relates to processes and intermediates for the preparation of 3-keto-19-alkylsteroids of the partial formula:

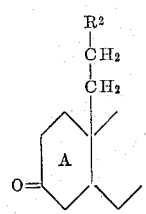
(IV)

wherein $R^2$ is a lower alkyl group, preferably having from 1 to 4 carbon atoms, such as methyl, ethyl, propyl, isopropyl, n-butyl, or isobutyl.

The invention also relates to dehydro derivatives of the above compounds which have partial formulas:

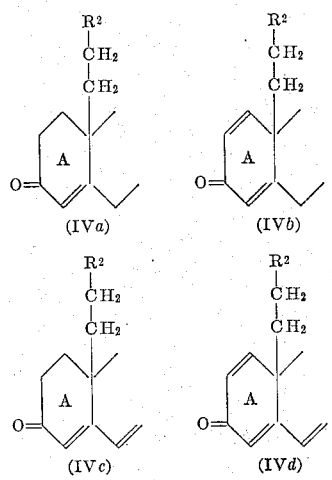

(IVa)   (IVb)
(IVc)   (IVd)

The process of the invention is carried out either by (a) reacting a 10-formylsteroid having the partial formula:

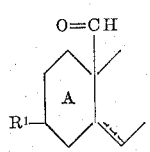
(I)

wherein $R^1$ is hydroxy, esterified hydroxy, or etherified hydroxy, and the dashed bond can be absent or can represent half of an olefinically unsaturated bond with a triarylalkylidene phosphorane in which the alkylidene group has the formula =CH—$R^2$ wherein $R^2$ has the same meaning as above, to form 19-alkylidenesteroids of the partial formula:

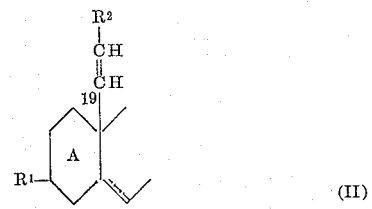
(II)

wherein $R^1$, $R^2$, and the dashed bond have the same meanings as above.

The unsaturated bond(s) are then hydrogenated, and where $R^1$ is hydroxy, a 3-hydroxy-19-alkylsteriod of the following partial formula is obtained:

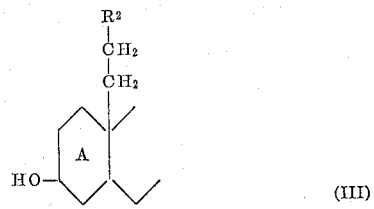
(III)

When $R^1$ is other than hydroxy, i.e., an etherified or esterified hydroxy group, the hydrogenation product which has the partial formula:

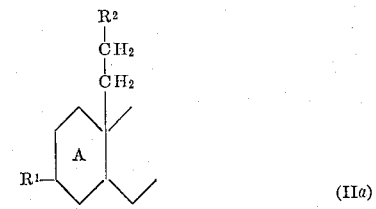
(IIa)

wherein $R^2$ has the above meaning and $R^1$ is either an etherified or esterified hydroxy group, is treated by hydrolysis to form the compound or partial Formula III.

Compounds of partial Formula III are then oxidized to 3-keto-19-alkylsteroids of partial Formula IV above, or, if desired, to a dehydro derivative of partial Formulas IVa, IVb, IVc, or IVd. Alternatively, the process of the invention can be carried out by (b) reacting the formylsteroid of partial Formula I with a metal alkylcompound containing at least two carbon atoms in the alkyl component, e.g., a Grignard reagent such as an alkyl magnesium halide, wherein the alkyl group contains from two to eight carbon atoms, and converting the reaction product into a 19-alkylsteroid of partial Formula III and then proceeding as in process (a) above.

When $R^1$ above is an esterified hydroxy group, it is preferably an acyloxy group wherein the acyl portion is from a saturated aliphatic monocarboxylic acid, for example, having from 1 to 12 carbon atoms, such as acetic acid, or from an aromatic carboxylic acid, such as benzoic acid. When $R^1$ is an etherified hydroxy group, it is preferably a tetrahydropyranyloxy group.

The starting materials of Formula 1 are preferably steroids of the androstane or pregnane type, especially those having the formula:

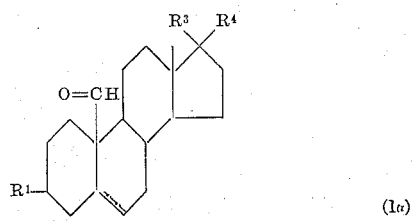
(Ia)

wherein $R^1$ and the dashed bond have the above meaning; $R^3$ is a hydrogen atom or an $R^1$ group; $R^4$ is a hydrogen atom or a $-CH_3$, $-C_2H_5$, $-CH=CH_2$, $-C\equiv CH$, $-COCH_3$,

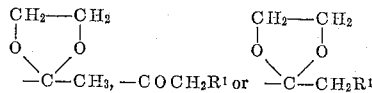

$-C-CH_3$, $-COCH_2R^1$ or $-C-CH_2R^1$ wherein $R^3$ and $R^4$ together can also be an oxo group.

Examples of such starting steroids include:

19-oxo-$\Delta^5$-androsten-3$\beta$,17$\beta$-diol and its diacetate
19-oxo-androstan-3$\beta$,17$\beta$-diol and its diacetate
19-oxo-$\Delta^5$-androsten-3$\beta$-ol-17-one-3-acetate-17-ethyleneketal
19-oxo-$\Delta^5$-pregnen-3$\beta$-ol-20-one-3-acetate-20-ethyleneketal According to a preferred method for carrying out the process of the invention the starting material of partial Formula I is a 3-acyloxy-$\Delta^5$-10-formylsteroid and this is reacted in a first step of the process with a triarylalkylidene phosphorane, according to Witting, to the corresponding 19-alkylidene compound of partial Formula II. The preparation of the phosphorane components as, for example, the triarylalkylidene phosphorane of the formula $(C_6H_5)_3P=CHCH_3$ as well as their reaction with the 10-formylsteroid (Wittig reaction) can be effected in accordance with known methods [see, for example, Angewandte Chemie 71, 260 (1959)]. The reaction of the 3-acyloxy-$\Delta^5$-10-formylsteroid with the phosphorane derivative is preferably carried out by reacting the phosphorane immediately after its preparation in situ with the 10-formylsteroid at a temperature in the range of from about 35 to about 135° C., preferably in the range of from about 70 to 80° C. The resulting 19-alkylidenesteroid can be isolated, for example, by evaporating the reaction solution and chromatographing the residue. Compounds having hydrolyzable groups such as, for example, the acyloxy groups in the 3- and 17-positions are partly saponified during the workup. If desired such compounds can then be treated prior to the hydrogenation step with an acylating agent.

The ethylene bonds of the 19-alkylidene compounds of partial Formula II are then saturated by hydrogenation, followed by hydrolysis of the esterified or etherified hydroxy groups, if present, to form the corresponding 19-alkylsteroids of partial Formula III. Alternatively, the hydrolysis step can be carried out prior to the hydrogenation step. The hydrogenation step is carried out with catalytically activated hydrogen at room temperature and atmospheric pressure. As hydrogenation catalysts, the usual metal catalysts such as nickel, palladium, or platinum catalysts, can be employed. The hydrogenation can be carried out in acid medium, e.g., in glacial acetic acid, or in neutral medium, e.g., in an organic solvent, e.g., ethanol, benzene, toluene, etc. By the use of an acid medium, the hydrogenation converts the 5,6-unsaturated compounds of partial Formula II preferentially to the 5$\alpha$-isomer.

The hydrolysis of the esterified or etherified hydroxy group can be carried out according to usual saponification methods; for example, the acyloxy group can be saponified to the free hydroxy group with alcoholic sodium or potassium hydroxide, or with lithium aluminum hydride.

The 3-hydroxy group of the obtained 3-hydroxy-19-alkylsteroids of partial Formula III is thereafter oxidized to the keto group. The oxidation can be carried out according to known processes, e.g., according to Oppenauer [see, e.g., Organic Syntheses 21, 18 (1941)] by means of aluminum trialcoholate such as aluminum tritertiary butylate or by means of the oxide of a polyvalent metal, such as manganese dioxide and, especially, chromium trioxide.

If desired, the obtained 3-keto-19-alkyl compounds of partial Formula IV are converted, according to known processes, into the corresponding dehydro derivatives of Formulas IV$a$, IV$b$, IV$c$, or IV$d$. For the dehydrogenation suitable dehydrogenating agents, such as, e.g., dichlorodicyanobenzoquinone in benzene or dioxane, chloroaniline in amyl alcohol, etc., can be employed. The dehydrogenation can also be carried out according to known methods by brominating the compounds of partial Formula III in the 2- and/or 4-positions and then dehydrobrominating, whereupon the $\Delta^4$- or the $\Delta^{1,4}$-3-ketosteroids of partial Formulas IV$a$ or IV$b$ are obtained.

An alternative method of carrying out the process of the invention, as described above, comprises reacting a 10-formylsteroid of partial Formula I with a metal alkyl compound in which the alkyl portion has at least two carbon atoms, e.g., with an alkyl magnesium halide wherein the alkyl group contains from 2 to 8 carbon atoms, according to Grignard, or with an alkyl-alkali metal compound. In 10-formylsteroids containing a carbonyl group, e.g., a 17- or 20-oxo group, the carbonyl group is present in a protected, e.g., ketalized, form. Examples of metal organic compounds that can be employed in this step are ethyl-, propyl-, isopropyl-, butyl-, isobutyl-, etc., magnesium halides (such as the bromide, chloride, or iodide), or the corresponding lithium compounds such as ethyl lithium, butyl lithium, etc. The reaction product obtained is thereafter hydrolyzed to the corresponding secondary alcohol according to the usual methods, and the secondary hydroxyl group in position 19 replaced with a hydrogen atom. This can, for example, be carried out by esterification of the 19-hydroxy group with p-toluenesulfonic acid halide, e.g., chloride or bromide, and the resulting tosylate treated with lithium aluminum hydride. The obtained 19-alkylsteroid of partial Formula III is then reacted further as described above.

The 10-formylsteroids of Formula I which are used as starting materials insofar as they are unknown compounds can be prepared according to known methods (see, for example, Experientia 18 (1962) 464).

The compounds of the invention of Formulas IV and IV$a$–IV$d$ have hormonal activity, e.g., anabolic, androgenic, estrogenic, and antiprogestational activity. They also possess positive inotropic cardiac activity. They may, accordingly, be used an anabolic agents, androgens, estrogens, and antiprogestative agents.

*Example 1*

To a suspension of 9.6 g. of triphenyl-ethyl-phosphonium bromide in 1000 ml. of tetrahydrofuran is added in one portion at room temperature while stirring an ethereal solution of 2.2 g. of phenyl-lithium. A red color results. A solution of 1 g. of 19-oxo-$\Delta^5$-androsten-3$\beta$,17$\beta$-diol-diacetate in 40 ml. of tetrahydrofuran is added thereto in one portion, and the mixture stirred at reflux for two days. The color of the mixture gradually lightens. The yellow reaction solution is then evaporated to dryness under reduced pressure and the residue treated with pyridine/acetic anhydride (200 ml. of pyridine, 100 ml. of acetic anhydride) for the purpose of reintroducing the partially split off acetyl) groups. There are thus obtained 5 g. of an orange colored partially crystalline product, which is purified by chromatography on a 45-fold amount of silica gel and subsequent recrystallization from low boiling petroleum ether. The thus obtained 19-ethylidene-$\Delta^5$-androsten-3$\beta$,17$\beta$-diol-diacetate (600 mg.; 60 percent) melts, after recrystallization, at 117° C.

400 mg. of the 19-ethylidene compound obtained above are hydrogenated in 15 ml. of glacial acetic acid in the presence of a platinum catalyst (prehydrogenated $PtO_2$) under normal conditions. The hydrogenation curve rises steeply and levels off sharply after the uptake of 2 mol. equivalents of hydrogen. After filtration from the catalyst and evaporation of the filtrate, there are obtained 435 mg. of a yellow oil, when is then dissolved in ether and treated with 500 mg. of lithium aluminum hydride while stirring at room temperature for the purpose of saponification of the acetoxy groups. After the addition of dilute hydrochloric acid, the mixture is extracted with ether. 342 mg. of 19-ethyl-5α-androstan-3β,17β-diol is obtained from the ether solution in the form of a light yellow foam.

To a solution of this diol in 15 ml. of glacial acetic acid are added 1.37 ml. of a solution of 400 mg. of chromium trioxide in 0.4 ml. of water and 1.6 ml. of glacial acetic acid, and the mixture is held for 1¼ hours at 50° C. To the brown-green solution are added 15 ml. of ethanol for the purpose of decomposing the excess chromium trioxide. After workup, there are obtained 316 mg. of 19-ethyl-5α-androstan-3,17-dione in the form of a yellow oil which is purified by chromatography on an 80-fold amount of silica gel and subsequent recrystallization from ether/petroleum ether. Melting point: 123° C.

The 19-oxo-Δ⁵-androsten-3β,17β-diol-diacetate used as the starting material can be obtained as follows:

400 ml. of an aqueous 5 percent sodium nitrite solution are added dropwise while stirring into a solution of 8 g. of the oxime of n19-oxo-Δ⁵-androsten-3β,17β-diol-diacetate in 800 ml. of glacial acetic acid and the mixture, after stirring for one hour, is allowed to stand for 1 to 3 days at room temperature. Subsequently the mixture is poured into 3000 ml. of ice water and exhaustively extracted with ether. After the usual workup there are obtained 10.1 g. of a yellow oil from which the 19-oxo compound can be obtained in a yield of 45 percent by chromatography on silica gel and subsequent crystallization from ether/petroleum ether. Melting point: 150–152° C.

*Example 2*

2.4 g. of 19-ethylidene-Δ⁵-androsten-3β,17β-diol-diacetate (prepared in Example 1 above) are dissolved in 150 ml. of methanol. After the addiiton of 2 g. of sodium hydroxide, the solution is stirred for 5 hours at room temperature and thereafter evaporated to dryness under vacuum. Crystalline 19-ethylidene-Δ⁵-androsten-3β,17β-diol, obtained by working up the above residue, sinters at 90° C. then solidifies again and melts at 165° C. (Uncorrected). The yield is practically quantitative.

4.3 g. of 19-ethylidene-Δ⁵-androsten-3β,17β-diol obtained above is hydrogenated with 1.5 g. of previously hydrogenated platinum oxide in 250 ml. of glacial acetic acid with shaking. After 1½ hours the hydrogen uptake is 570 ml. (theory 600 ml.). The reaction mixture is filtered and the filtrate evaporated to dryness. From the resulting residue is isolated 4.25 g. of crude 19-ethyl-5α-androsten-3β,17β-diol which melts incompletely at 177-178°. It contains as a by-product a small quantity of the 5β-isomer.

4.25 g. of the so-obtained crude 19-ethyl-5α-androstan-3β,17β-diol is dissloved in 695 ml. of acetone. The solution is cooled to 2° C. At this temperature 17.4 ml. of Jones reagent is dropped in (the Jones reagent employed is a mixture of 66.8 g. of chromium trioxide, 57.5 ml. of concentrated sulfuric acid, and water ad 250 ml. of water). After 5 minutes an additional 17.4 ml. of the Jones reagent is dropped in. After 5 minutes more the reaction mixture is poured into 2.5 liters of ice water containing 30 g. of sodium bicarbonate. The resulting turbid mixture is treated five times, each time with 600 ml. of ether. The extracts are combined, washed until neutral with water, dried over anhydrous sodium sulfate, and evaporated to dryness. The residue consists of 3.92 g. of an oil which analyzes on thin layer chromatography to be predominantly the 5α-isomer, e.g., 19-ethyl-5α-androstan-3,17-dione. After purification by chromatography (silica gel) (particle size, 0.05–0.2 mm.; elution with benzeneether, 98:2 and ether fractions of 100 ml.), there is obatined 2.49 g. of pure 19-ethyl-5α-androstan-3,17-dione.

94.8 mg. of 19-ethyl-5α-androstan-3,17-dione is shaken in a pressure tube with 0.96 ml. of glacial acetic acid containing 1.5 percent water, 97.2 mg. of benzyl alcohol, and 321 mg. of N-bromosuccinimide and maintained for 3 hours at 60° C. The resulting dark brown solution is mixed with water and the mixture extracted several times with ether. The ether extracts are treated with sodium thiosulfate and sodium bicarbonate solutions and lastly with water until neutral. After drying over anhydrous sodium sulfate and concentrating to dryness, 180 mg. of crude 2,4-dibromo-19-ethyl-5α-androstan-3,17-dione is obtained which is reacted further as follows:

The obtained crude dibromo compound (180 mg.) is heated to 110° C. for 24 hours with a mixture of 1.0 ml. of dimethyl formamide, 85 mg. of lithium carbonate, and 65 mg. of lithium bromide whereupon the suspension goes into solution. The resulting solution is treated with 15 ml. of water and several drops of glacial acetic acid, stirred for 10 minutes at room temperature and thereafter extracted with methylene chloride. The extracts are washed with sodium bicarbonate solution and then with water, dried, and then evaporated to dryness. 120 mg. of an oil is obtained. Upon column chromatography of the oil on a 30-fold quantity of ALOX III with a benzene/petroleum ether mixture (1:1), 19-ethyl-Δ¹,⁴-androstadien-3,17-dione of melting point 180° C. is isolated.

*Example 3*

To a suspension of 400 mmole of ethyl magnesium bromide (prepared from 9.6 g. of magnesium and 44 g. of ethyl bromide) in 150 ml. of absolute tetrahydrofuran at room temperature under constant stirring in the course of 5 minutes is added a solution of 18.2 mmole (5.573 g.) of 19-oxo-Δ⁵-androsten-3β,17β-diol in 100 ml. of absolute tetrahydrofuran. The reaction mixture thereupon begins to boil. After the reaction slows, the mixture is held for 3 hours under stirring at reflux temperature. Thereafter the Grignard complex formed is destroyed by the addition of saturated ammonium chloride solution. The mixture is taken up in water-ethyl acetate and the emulsion broken with 3 N hydrochloric acid. The aqueous portion is then extracted with ethyl acetate, the ethyl acetate fractions combined, washed with water, dried over sodium sulfate and the ethyl acetate removed. 5.095 g. of white partially crystallized product is obtained. This product is chromatographed on an 80-fold quantity of silica gel and eluted with benzene-ether (1:1). 1173 mg. of a substance which by thin layer chromatography is shown to be mostly 19-ethyl-Δ⁵-androsten-3β,17β-19-triol is obtained. Upon further purification by rechromatographing the compound and recrystallizing from acetone-high boiling petroleum ether, the melting point is 166° C. 19-ethyl-5α-androstan-3,17-dione of melting point 123° C. can be obtained from this triol.

We claim:
1. A compound of the formula

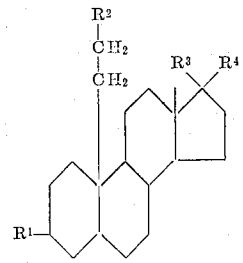

wherein R¹ is selected from the group consisting of hydroxy, lower alkanoyloxy, and lower alkoxy; R² is lower alkyl; R³ is selected from the group consisting of hydroxy, lower alkanoyloxy, and lower alkoxy; and R⁴ is selected from the group consisting of hydrogen, —CH₃, —C₂H₅, —CH=CH₂, —CH≡CH, —COCH₃, and —COCH₂R¹, wherein R¹ has the above meaning.

2. 19-ethyl-androstan-3β,17β-diol diacetate.
3. 19-ethyl-5β-androstan-3β,17β-diol.
4. 19-ethyl-5α-androstan-3β,17β-diol.

References Cited by the Examiner

UNITED STATES PATENTS

| | | | |
|---|---|---|---|
| 2,844,603 | 7/1958 | Strojny et al. | 260—297.5 |
| 3,102,127 | 8/1963 | Bowers | 260—397.4 |
| 3,145,202 | 8/1964 | Bowers | 260—397.55 |
| 3,205,242 | 9/1965 | Bowers | 260—397.4 |
| 3,206,458 | 9/1965 | Bowers | 260—239.55 |

OTHER REFERENCES

Lowenthal, Tetrahedron, volume 6, pp. 269–303, pp. 269–275 relied on (1959).

LEWIS GOTTS, *Primary Examiner.*

H. A. FRENCH, *Assistant Examiner.*

UNITED STATES PATENT OFFICE
CERTIFICATE OF CORRECTION

Patent No. 3,309,387                       March 14, 1967

Andor Fürst et al.

It is hereby certified that error appears in the above numbered patent requiring correction and that the said Letters Patent should read as corrected below.

Column 4, line 59, for "acetyl)" read -- acetyl --; column 5, line 21, for "n19-oxo" read -- 19-oxo --; column 6, line 74, for "-CH≡CH" read ---C≡CH --; column 7, line 9, for "260-397.55" read -- 260-239.55 --.

Signed and sealed this 25th day of June 1968.

(SEAL)
Attest:

Edward M. Fletcher, Jr.                      EDWARD J. BRENNER

Attesting Officer                            Commissioner of Patents